US012152915B2

United States Patent
Turner et al.

(10) Patent No.: US 12,152,915 B2
(45) Date of Patent: Nov. 26, 2024

(54) PROBE FOR MONITORING A MOVING ENGINE ELEMENT

(71) Applicant: Weston Aerospace Limited, Farnborough (GB)

(72) Inventors: Nigel Turner, Farnborough (GB); Paul Hanscombe, Farnborough (GB); Martin Brown, Farnborough (GB); Dean Dobson, Farnborough (GB)

(73) Assignee: WESTON AEROSPACE LIMITED, Farnborough (GB)

( * ) Notice: Subject to any disclaimer, the term of this patent is extended or adjusted under 35 U.S.C. 154(b) by 613 days.

(21) Appl. No.: 16/709,124

(22) Filed: Dec. 10, 2019

(65) Prior Publication Data

US 2020/0191610 A1 Jun. 18, 2020

(30) Foreign Application Priority Data

Dec. 12, 2018 (GB) ..................................... 1820253

(51) Int. Cl.
*G01D 5/241* (2006.01)
*B23K 1/00* (2006.01)
(Continued)

(52) U.S. Cl.
CPC .......... *G01D 5/2417* (2013.01); *B23K 1/0008* (2013.01); *B23K 2103/52* (2018.08); *G01M 15/14* (2013.01)

(58) Field of Classification Search
CPC .... B23K 1/0008; B23K 2103/52; B23K 1/00; G01B 7/14; G01D 5/2417; G01D 5/241;
(Continued)

(56) References Cited

U.S. PATENT DOCUMENTS

| | | | | |
|---|---|---|---|---|
| 4,804,905 A | * | 2/1989 | Ding | ....................... F01D 21/04 324/662 |
| 4,806,848 A | * | 2/1989 | Demers | .................... G01B 7/14 324/683 |

(Continued)

FOREIGN PATENT DOCUMENTS

| | | |
|---|---|---|
| EP | 880672 B1 | 9/2002 |
| EP | 2570618 A2 | 3/2013 |

(Continued)

OTHER PUBLICATIONS

GB Pat. App. No. 1820253.1, Search Report under Section 17(5) dated Jun. 25, 2019, 3 pages.

(Continued)

*Primary Examiner* — Dana Ross
*Assistant Examiner* — Adam M Eckardt
(74) *Attorney, Agent, or Firm* — Fredrikson & Byron, P.A.

(57) ABSTRACT

A probe (1, 101) for monitoring a moving engine element and a method of forming a probe (1, 101) for monitoring a moving engine element, the probe (1, 101) comprising: a housing (2, 102) formed of electrically insulating ceramic material; a core (14, 114) formed of electrically insulating ceramic material, the core (14, 114) comprising a front face (16, 116; and a sensing electrode (20, 120) formed of electrically conductive material, the sensing electrode (20, 120) being arranged between the housing (2, 102) and the front face (16, 116) of the core (14, 114) and the housing (2, 102) and the front face (16, 116) of the core (14, 114) being bonded together by the sensing electrode (120).

14 Claims, 2 Drawing Sheets

(51) Int. Cl.
*B23K 103/00* (2006.01)
*G01M 15/14* (2006.01)

(58) Field of Classification Search
CPC ...... G01M 15/14; F01D 21/003; F01D 21/00; F05D 2220/32; F05D 2220/76; F05D 2260/80; F05D 2270/303; H04Q 2209/40; H04Q 9/00; H02K 15/16; Y02T 50/60; G06Q 20/4016; G06Q 20/425; G06Q 20/40; G06Q 20/42; H04W 64/00; F02C 3/04; G08C 19/22
See application file for complete search history.

(56) References Cited

U.S. PATENT DOCUMENTS

| | | | | |
|---|---|---|---|---|
| 4,924,172 | A * | 5/1990 | Holmgren | G01B 7/14 324/690 |
| 4,950,084 | A * | 8/1990 | Bailleul | G01P 3/483 374/E13.01 |
| 5,027,645 | A * | 7/1991 | Leitmeier | G01B 5/003 73/114.28 |
| 5,101,165 | A * | 3/1992 | Rickards | G01B 7/14 324/681 |
| 5,760,593 | A * | 6/1998 | Lawrence | G01B 7/14 250/559.31 |
| 5,814,985 | A * | 9/1998 | Oudet | G01P 3/488 324/207.2 |
| 5,973,502 | A * | 10/1999 | Bailleul | G01D 11/245 324/662 |
| 8,893,555 | B2 * | 11/2014 | Bourbeau | G01L 9/0072 73/717 |
| 9,175,941 | B2 * | 11/2015 | Giroud | H03K 17/9505 |
| 9,372,204 | B2 * | 6/2016 | Elliott | G01R 1/04 |
| 9,417,048 | B2 * | 8/2016 | Esler | G01B 7/14 |
| 9,562,923 | B2 * | 2/2017 | Cox | G01P 3/44 |
| 10,436,612 | B2 * | 10/2019 | Ford | F01D 17/02 |
| 2005/0218887 | A1 * | 10/2005 | Twerdochlib | F01D 21/003 324/207.16 |
| 2005/0280412 | A1 * | 12/2005 | Roeseler | F01D 17/06 324/228 |
| 2010/0079136 | A1 * | 4/2010 | Phillips | G01B 7/14 324/207.16 |
| 2011/0006791 | A1 * | 1/2011 | Schneider | G01B 7/14 324/690 |
| 2013/0181700 | A1 * | 7/2013 | Zern | G01B 7/023 324/207.13 |
| 2013/0321000 | A1 * | 12/2013 | Andarawis | G01B 5/14 324/658 |
| 2013/0321002 | A1 * | 12/2013 | Elliott | G01R 3/00 324/662 |
| 2014/0090492 | A1 * | 4/2014 | Warren | G01D 11/30 73/866.5 |
| 2014/0119884 | A1 * | 5/2014 | Esler | G01B 7/14 415/13 |
| 2015/0098161 | A1 * | 4/2015 | Horowy | H02H 9/02 361/87 |
| 2015/0107342 | A1 * | 4/2015 | Jensen | G01H 11/00 73/112.01 |
| 2015/0242612 | A1 * | 8/2015 | Moberg | A63F 13/218 726/2 |
| 2017/0064415 | A1 * | 3/2017 | Berkcan | H04Q 9/00 |
| 2019/0056250 | A1 * | 2/2019 | Elliott | G01D 5/16 |
| 2020/0191610 | A1 * | 6/2020 | Turner | G01B 7/14 |

FOREIGN PATENT DOCUMENTS

| | | | |
|---|---|---|---|
| EP | 2896929 A1 | 7/2015 | |
| EP | 3018445 A1 * | 5/2016 | F01D 17/02 |
| EP | 2818839 B1 | 8/2016 | |
| EP | 2627975 B1 | 9/2017 | |
| EP | 3380813 A1 | 10/2018 | |
| GB | 2225855 A | 6/1990 | |
| GB | 2270383 A | 3/1994 | |
| GB | 2423957 A | 9/2006 | |
| WO | 9740340 A1 | 10/1997 | |
| WO | WO-2012049443 A2 * | 4/2012 | G01D 11/245 |

OTHER PUBLICATIONS

Bailleul et al., "Review of Progress in the Development of Capacitive Sensors for Blade Tip Clearance Measurement," presented at the 1996 ASME Turbo Asia Conference, Nov. 5-7, 1996, Downloaded From: https://proceedings.asmedigitalcollection.asme.org on Nov. 13, 2018, 5 pages.

Canonico et al., "Direct Brazing of Ceramics, Graphite, and Refractory Metals," Oak Ridge National Laboratory, Mar. 1976, 18 pages.

Chivers, "A Technique for the Measurement of Blade Tip Clearance in a Gas Turbine," Thesis submitted for the degree of Doctor of Philosophy in the University of London and for the Diploma of membership of Imperial College, Feb. 1989, 233 pages.

EP Pat. App. No. 19215401.1, Extended European Search Report mailed May 4, 2020, 7 pages.

Sheard, "Blade by Blade Tip Clearance Measurement," International Journal of Rotating Machinery, vol. 2011, Article ID 516128, Aug. 2011, 13 pages.

* cited by examiner

PROBE FOR MONITORING A MOVING ENGINE ELEMENT

RELATED APPLICATIONS

This application claims priority to British Application No. 1820253.1, filed Dec. 12, 2018, the teachings of which are incorporated herein by reference.

The present invention relates to a probe for monitoring a moving engine element. In particular, the present invention relates to a probe for monitoring moving engine elements such as blades, blade discs and shafts in gas turbines, compressors and turbochargers.

Non-contact probes that are capable of monitoring the condition of moving engine elements without directly contacting the moving engine element have been developed. For example, non-contact probes that are capable of monitoring the condition of turbine blades in gas turbines without directly contacting the turbine blades have been developed. One use of such non-contact probes is for measuring the distance or clearance between the tips of turbine blades and a casing surrounding the blades. Another use for such non-contact probes is to measure the duration of time that it takes successive turbine blades to reach a particular position, which may be used to indicate abnormal vibrations of the turbine blades.

One particular type of non-contact probe that has been developed is a capacitive probe. Capacitive probes generally comprise a sensing electrode that forms one electrode of a capacitor, the other electrode of the capacitor being formed by the tip of a turbine blade as the turbine blade passes over the probe.

Various designs of capacitive probe have been proposed and developed. An example of a non-contact capacitive probe is described in U.S. Pat. No. 9,372,204 B2, in the name of FUTURE TECHNOLOGY SENSORS LTD. U.S. Pat. No. 9,372,204 B2 describes a sensor body that can be used as part of a sensor assembly, optionally a capacitive sensor that is used to measure the clearance between the tip of a gas turbine engine blade and the surrounding casing. The sensor body includes a core layer having an electrically conductive electrode layer. An outer insulating layer substantially surrounds the core layer and extends along a front part of the sensor body to define a window layer that provides a hermetic seal that excludes gas from any interface between the constituent layers of the sensor body. The core layer and the outer insulating layer are formed of the same electrically insulating ceramic material to avoid any problems with differential thermal expansion. The electrode layer is embedded within a front part of the sensor body and extends between the core layer and the window layer.

This type of non-contact probe is typically adapted to be mounted in a casing of a gas turbine and is required to function at temperatures close to the operating temperatures within the gas turbine. Operating temperatures of gas turbines typically reach at least 1000 degrees Celsius, and may even reach temperatures in excess of 1500 degrees Celsius following improvements in the thermodynamic efficiency of gas turbines. The extreme high temperature environments within gas turbines impose certain design considerations on non-contact probes, in particular to avoid movement of components within the probes due to differential thermal expansion, which can affect the reliability of measurements and cause damage to the probe.

Other types of non-contact probes are required to function in lower temperature environments, such as probes adapted for use in compressors, which are typically required to function at temperatures of between 300 degrees Celsius and 600 degrees Celsius.

A problem with some known designs of capacitive probes is that the probes comprise several different metal and ceramic components and several metal to metal, metal to ceramic and ceramic to ceramic interfaces, which can result in unwanted stresses within the probe due to differential thermal expansion of the different components. Another problem with some known designs of capacitive probes is that the probes comprise several relatively large metal surfaces separated by layers of electrically insulating material, which can result in relatively large internal capacitances arising within the probes. A further problem with some known designs of capacitive probes is that the probes require specialised, non-standard manufacturing techniques, which can be complex and expensive to implement.

It would be desirable to provide a probe for measuring a moving engine element that experiences minimal stresses due to differential thermal expansion of different components in the probe. It would be desirable to provide a probe with a low or minimal internal capacitance. It would be desirable to provide a probe that is straightforward to manufacture using standard manufacturing techniques. It would be desirable to provide a probe having a minimal number of component parts.

According to a first aspect of the present invention, there is provided a probe for monitoring a moving engine element, the probe comprising: a housing formed of electrically insulating ceramic material; a core formed of electrically insulating ceramic material, the core comprising a front face; and a sensing electrode formed of electrically conductive material, the sensing electrode being arranged between the housing and the front face of the core and the housing and the front face of the core being bonded together by the sensing electrode.

Advantageously, using the sensing electrode to bond together the ceramic housing and core may negate the need for additional adhesive or bonding layers between the sensing electrode, the housing and the core. This may minimise the thickness and mass of the material between the housing and the front face of the core, which may minimise the stresses experienced by the probe due to differential thermal expansion between the ceramic housing and core and the sensing electrode. Advantageously, using the sensing electrode to bond together the housing and the front face of the core may also minimise the number of material to material interfaces between the housing, the core and the sensing electrode. Also advantageously, using the sensing electrode to bond together the housing and the front face of the core may provide support to the outer housing, enabling the thickness of the outer housing to be minimised at the sensing electrode.

In some embodiments, the sensing electrode may have at least one end that is exposed for electrical connection to circuitry of a sensor system.

In some preferred embodiments, the core comprises a cavity having an open end at the front face. The probe may further comprise a contact formed of electrically conductive material, the contact being arranged in the cavity of the core and be electrically connected to the sensing electrode. The contact may enable an electrical connection to be made between the sensing electrode at one side of the probe and another side of the probe. The contact may also enable the sensor to be substantially surrounded by the ceramic material of the housing and the core, without an end of the sensing electrode being exposed.

Providing a contact within a cavity within the core may enable the contact to have a small surface area relative to the surface area of other electrically conductive components of the probe. Advantageously, providing the contact with a small surface area may minimise the contribution of the contact to the internal capacitance of the probe. Advantageously, providing the contact within a cavity within the core may also enable the sensing electrode to have a width that is greater than the width of the contact and a shape that is different to the cross-sectional shape of the contact.

The probe may be any type of probe that is suitable for monitoring a moving engine element. In preferred embodiments, the probe is a capacitive probe. In these preferred embodiments, the sensing electrode may define one of the electrodes of a capacitor. The other electrode of the capacitor may be formed by a moving engine element when a moving engine element is coupled with the sensing electrode.

In a preferred embodiment, there is provided a capacitive probe for monitoring a moving engine element. The capacitive probe comprises: a housing formed of electrically insulating ceramic material; a core formed of electrically insulating ceramic material, the core comprising a front face; and a sensing electrode formed of electrically conductive material. The sensing electrode is arranged between the housing and the front face of the core and the housing and the front face of the core are bonded together by the sensing electrode. The sensing electrode defines one of the electrodes of a capacitor, the other electrode being formed by a moving engine element when a moving engine element is coupled with the sensing electrode.

In particularly preferred embodiments, the probe is a capacitive probe for monitoring a moving engine element of at least one of: a turbine; a compressor and a turbocharger. The moving engine element may be at least one of: a blade; a blade disc and a shaft. In some preferred embodiments, the probe is a capacitive probe adapted to monitor turbine blades of a gas turbine. The probe may be suitable for monitoring the distance or clearance between a casing of a gas turbine and the tip of a turbine blade of the gas turbine. The probe may be suitable for monitoring the vibrations of turbine blades in gas turbines, particularly by measuring the timing between tips of successive turbine blade passing over the sensor. The probe may be adapted to be secured to the casing of a gas turbine. The gas turbine may be a jet engine.

The components of the probe may be formed of any suitable materials. In particular, the components of the probe may be formed of materials having a melting point above the operating temperature of the engine or engine component in which it is mounted. For example, where the probe is adapted for use in a gas turbine, the materials of the components of the probe may have a melting temperature of at least 1000 degrees Celsius, at least 1100 degrees Celsius, at least 1200 degrees Celsius, at least 1300 degrees Celsius, at least 1400 degrees Celsius, at least 1500 degrees Celsius or at least 1600 degrees Celsius. For example, where the probe is adapted for use in a compressor, the materials of the components of the probe may have a melting temperature of at least 300 degrees Celsius, at least 400 degrees Celsius, at least 500 degrees Celsius or at least 600 degrees Celsius.

The probe comprises a sensing electrode formed of electrically conductive material. As used herein, an "electrically conductive" material means a material having a resistivity of $1 \times 10^{\wedge}4$ Ohm meters, or less.

The sensing electrode may be formed of any suitable electrically conductive material. In particular, the sensing electrode may be formed of an electrically conductive material having a melting point above the operating temperature of the engine or engine component in which the probe is mounted.

Preferably, the coefficient of thermal expansion of the sensing electrode is as close as possible to the coefficient of thermal expansion of the ceramic materials of the housing and the core. The coefficient of thermal expansion of the sensing electrode may be the same as the coefficient of thermal expansion of the ceramic materials of the housing and the core. Advantageously, this may prohibit or minimise differential thermal expansion between the sensing electrode and the housing and core.

The housing and the front face of the core are bonded together by the sensing electrode. The sensing electrode may bond together the housing and the front face of the core by any suitable means.

In some embodiments, the housing and the front face of the core may be bonded together by diffusion bonding. As used herein, diffusion bonding refers to a process for bonding two surfaces together which comprises raising the temperature of the surfaces to be joined to a temperature below the melting temperature of the surfaces and applying pressure to press the two surfaces to be joined together for a period of time.

In preferred embodiments, the housing and the front face of the core are bonded together by a braze joint comprising an electrically conductive braze filler material. In these preferred embodiments, the sensing electrode is formed of the electrically conductive braze filler material of the braze joint. In other words, the sensing electrode consists of the electrically conductive braze filler material of the braze joint. Advantageously, forming the sensing electrode from electrically conductive braze filler material may negate the need for additional bonding or adhesive layers between the housing, the sensing electrode and the core. This may minimise the number of material to material interfaces provided between the housing, the sensing electrode and the core. This may also minimise the thickness and the mass of the material between the housing and the front face of the core. Minimising the thickness and the mass of the material between the housing and the core may minimise the stresses experienced by the probe due to differential thermal expansion between the outer housing, the core and the sensing electrode.

As used herein, a "braze joint" refers to a joint between two surfaces that is formed by melting a braze filler material, wetting the surfaces to be joined with the molten braze filler material and solidifying the braze filler material to bond together the two surfaces by the braze filler material.

The electrically conductive braze filler material may comprise any suitable electrically conductive material.

The electrically conductive brazing filler material may comprise one or more metals. For example, the electrically conductive brazing filler material may comprise one or more of: gold, silver, nickel. The electrically conductive brazing filler material may comprise an alloy of one or more of: gold, silver, nickel.

In some embodiments, the electrically conductive brazing filler material may comprise one or more metals having a melting point of at least 1600 degrees Celsius. For example, the brazing filler material may comprise one or more of: titanium, vanadium, chromium, zirconium, hafnium, ruthenium, rhodium, osmium, iridium, palladium and platinum. The brazing filler material may comprise one or more refractory metals. As used herein, the term "refractory metal" is used to refer to a metal having a melting point of at least 2200 degrees Celsius, and includes niobium, molybdenum, tantalum, tungsten and rhenium. The electrically conductive braze filler material may comprise titanium, chromium and vanadium. The electrically conductive braze filler material may consist of titanium chromium and vanadium. The electrically conductive braze filler material may comprise titanium, zirconium and tantalum. The electrically conductive braze filler material may consist of titanium, zirconium and tantalum.

In some preferred embodiments, the electrically conductive braze filler material may consist of one or more metals. The electrically conductive braze filler material may consist of one metal. The electrically conductive braze filler material may consist of a plurality of metals. The electrically conductive braze filler material may be a braze metal or a braze alloy of metals.

Preferably, the coefficient of thermal expansion of the electrically conductive braze filler material is as close as possible to the coefficient of thermal expansion of the electrically insulating ceramic materials of the housing and the core.

In some embodiments, the ceramic surfaces to be joined may be pre-treated to improve the wetting of the ceramic surfaces by the molten braze filler material. For example, the surfaces to be joined may be metallised. In other words, the surfaces to be joined may be coated with a layer of metal prior to brazing. The surfaces to be joined may be metallised with any suitable metal or metal alloy.

In preferred embodiments, the electrically conductive braze filler material is an active filler material. As used herein, the term "active filler material" refers to a braze filler material capable of wetting the ceramic surfaces to be joined without metallisation of the surfaces. Using an active filler material may negate the need for pre-treatment of the ceramic surfaces to be joined before brazing. Advantageously, dispensing with the metallisation layers on the surfaces to be joined may enable the separation between the housing and the front face of the core to be reduced, may enable the thickness and mass of material between the housing and the front face of the core to be reduced, and may enable the number of manufacturing processes required to manufacture the probe to be reduced.

An active filler material comprises an activating component. As used herein, an "activating component" refers to a component of the braze filler material which reacts with the electrically insulating ceramic substrates of the housing and the core during the brazing procedure to form a series of intermetallic metallurgical phases with the ceramic substrate that are wetted by the molten filler material. Put in another way, an activating component is a component of the braze filler material that chemically reacts with the ceramic material of the housing and the core, decomposing the ceramic at the interface between the ceramic material and the filler material to form a reaction zone comprising reaction products with a different chemical structure to the ceramic. The modified chemical structure of the reaction zone leads to a reduction of the surface tension so that the reaction zone may be wetted by the filler metal.

The activating component may be any suitable activating component. The activating component may comprise a metal. For example, the activating component may comprise Beryllium. In some preferred embodiments, the activating component comprises a group 4 metal or group 5 metal. The activating component may comprise one or more group 4 metals, including one or more of titanium, zirconium and hafnium. The activating component may comprise one or more group 5 metals, including one or more of vanadium, niobium and tantalum.

The electrically conductive active braze filler material may comprise between 0.1 percent and 100 percent by weight of an activating component. The electrically conductive active braze filler material may comprise between 0.1 percent and 100 percent, between 0.1 percent and 90 percent, between 0.1 percent and 80 percent, between 0.1 percent and 70 percent, between 0.1 percent and 60 percent, between 0.1 percent and 50 percent, between 0.1 percent and 40 percent, between 0.1 percent and 30 percent, between 0.1 percent and 20 percent, between 0.1 percent and 10 percent or between 0.1 percent and 5 percent by weight of an activating component. The electrically conductive active braze filler material may comprise at least 0.1 percent, at least 0.2 percent, at least 0.5 percent, at least 1 percent, at least 5 percent, at least 10 percent, at least 20 percent, at least 30 percent, at least 40 percent, at least 50 percent, at least 60 percent, at least 70 percent, at least 80 percent, or at least 90 percent by weight of an activating component.

Preferably, in use, the sensing electrode is arranged in the vicinity of the moving engine elements to be monitored. In preferred embodiments, the housing has a front face and a rear face, opposite the front face, the rear face of the housing being bonded to the front face of the core by the sensing electrode. In these preferred embodiments, the front face of the housing typically forms the sensing face of the probe that is intended to be arranged adjacent to the moving engine elements to be monitored. In these preferred embodiments, increasing the surface area of the surface of the sensing electrode bonded to the rear face of the housing increases the measurement range of the sensor.

The sensing electrode may have any suitable shape and size.

The sensing electrode may be thin. As used herein, the term "thin" denotes a component having a thickness that is substantially smaller than the other dimensions of the component, such as width or diameter. As used herein, the terms "thickness" and "length" denote the dimension of a component in a longitudinal direction. As used herein, the terms "width" and "diameter" denote the dimension of a component in a transverse direction, perpendicular to the longitudinal direction. The sensing electrode may be a plate, a sheet or a disc.

The sensing electrode may have a thickness of between about 0.001 mm and about 1 mm, between about 0.001 mm and about 0.8 mm, or between about 0.001 mm and about 0.5 mm. The sensing electrode may have a thickness of at least about 0.001 mm, at least about 0.005 mm, at least about 0.01 mm, at least about 0.02 mm or at least about 0.05 mm. The sensing electrode may have a thickness of about 1 mm or less, about 0.8 mm or less, about 0.5 mm or less, about 0.3 mm less, about 0.2 mm or less or about 0.1 mm or less.

The sensing electrode may have a width or diameter of between about 0.5 mm and about 40 mm, between about 0.5 mm and about 30 mm, between about 0.5 mm and about 20 mm, between about 0.5 mm and about 10 mm or between about 0.5 mm and about 5 mm. The sensing electrode may have a width or diameter of at least about 0.5 mm, at least about 1 mm, at least about 1.5 mm, at least about 2 mm, at least about 3.5 mm or at least about 4 mm. The sensing electrode may have a width or diameter of about 40 mm or less, about 30 mm or less, about 20 mm or less or about 15 mm or less.

The sensing electrode may be substantially planar or flat. The sensing electrode may be curved. The curve of the sensing electrode may conform to the profile of an engine casing in which the sensor is to be mounted.

The sensing electrode may have any suitable transverse cross-sectional shape. For example, the sensing electrode may have a circular, elliptical, square, rectangular, triangular, pentagonal or hexagonal transverse cross-sectional shape. As used herein, the term "transverse cross-section" denotes the cross section of a component in a transverse direction, substantially perpendicular to the longitudinal direction.

In some embodiments, an end of the sensing electrode may be exposed to enable the sensing electrode to be electrically connected to a sensing system.

In preferred embodiments, the probe comprises a contact formed of electrically conductive material arranged in a cavity of the core and electrically connected to the sensing electrode. As used herein, the term "electrically connected" denotes an arrangement or connection of components that permits electrical current to flow between the components. Typically, the contact is electrically connected to the sensing electrode by direct physical contact with the sensing electrode. In some embodiments, the contact may be bonded to the sensing electrode.

The contact may be formed of any suitable electrically conductive material. In some embodiments, the contact may be formed of an electrically conductive material that is different to the electrically conductive material of the sensing electrode. In some preferred embodiments, the contact is formed of the same electrically conductive material as the sensing electrode. Advantageously, forming the sensing electrode and the contact from the same electrically conductive material may prevent or minimise differential thermal expansion of the sensing electrode and the contact.

The contact may be formed of an electrically conductive material having a melting point above the operating temperature of the engine or engine component in which the probe is mounted The electrically conductive material of the contact may comprise a metal. For example, the electrically conductive material of the contact may comprise one or more of: nickel, titanium, vanadium, chromium, zirconium, hafnium, ruthenium, rhodium, osmium, iridium, palladium, platinum, niobium, molybdenum, tantalum, tungsten and rhenium. The electrically conductive material of the contact may comprise a metal alloy.

In some embodiments, the electrically conductive material of the contact is an electrically conductive braze filler material. In some embodiments the contact may be formed of a braze joint in the cavity of the core. Advantageously, forming the contact from a braze joint in the cavity of the core may promote electrical connection between the sensing electrode and the contact. In some embodiments, the sensing electrode and the contact are formed of the same electrically conductive braze filler material.

The contact may have any suitable shape. In preferred embodiments, the contact is substantially cylindrical. The contact may have a shape that is substantially similar to the shape of the cavity of the core. For example, where the cavity of the core is substantially cylindrical, the contact may be substantially cylindrical. The contact may have any suitable transverse cross-sectional shape. For example, the contact may have a circular, elliptical, square, rectangular, triangular, pentagonal or hexagonal transverse cross-sectional shape. The contact may have a transverse cross-sectional shape that is substantially constant along the thickness or length of the contact.

The width or diameter of the contact is less than the width or diameter of the core and the width or diameter of the sensing electrode. The contact may be elongate. As used herein, the terms "elongate" denotes a component having a thickness or length that is substantially larger than the other dimensions of the component, such as the width or diameter. The contact may be narrow. As used herein, the term "narrow" denotes a component having a width or diameter that is substantially smaller than the other dimensions of the component, such as the thickness or length. Preferably, the width or diameter of the contact is similar to the width or the diameter of the cavity of the core.

The contact may have a length that is equal to or greater than the length of the cavity of the core. Advantageously, this may enable the contact to extend out of the cavity to facilitate electrical connection of the contact with an electrical connector. The contact may substantially fill the cavity of the core. The contact may have a length that is less than the length of the cavity of the core.

The contact may have a length of between about 2 mm and about 80 mm, between about 2 mm and about 70 mm, or between about 2 mm and about 60 mm. The contact may have a length of at least about 2 mm, at least about 2.5 mm, at least about 5 mm, at least about 10 mm or at least about 15 mm. The contact may have a length of about 80 mm or less, about 70 mm or less, about 60 mm less, about 40 mm or less or about 30 mm or less.

The contact may have a width or diameter of between about 0.5 mm and about 40 mm, between about 0.5 mm and about 30 mm, between about 0.5 mm and about 20 mm, between about 0.5 mm and about 10 mm or between about 0.5 mm and about 5 mm. The contact may have a width or diameter of at least about 0.5 mm, at least about 1 mm, at least about 1.5 mm, at least about 2 mm, at least about 3.5 mm or at least about 4 mm. The contact may have a width or diameter of about 30 mm or less, about 20 mm or less or about 15 mm or less. The width or diameter of the contact may be substantially constant along the length of the contact.

In some embodiments, the shape and size of the contact, relative to the cavity of the core, may provide one or more gaps between the contact and the core that provide expansion regions to reduce stresses on the probe due to differential thermal expansion between the core and the contact.

The probe comprises a core formed of electrically insulating ceramic material. As used herein, a "ceramic material" refers to an inorganic, non-metallic solid. As used herein, an "electrically insulating" material means a material having a resistivity of $1 \times 10^{4}$ Ohm meters, or more. Preferably the ceramic material is substantially transparent to electromagnetic fields.

The core may be formed of any suitable electrically insulating ceramic material. In particular, the core may be formed of an electrically insulating material having a melting point above the operating temperature of the engine or engine component in which the probe is mounted.

In some embodiments, the ceramic material may comprise one or more of: alumina, zirconia, boron carbide, silicon nitride and aluminium nitride.

The core comprises a front face. The core may further comprise a rear face, opposite the front face. The core may further comprise a side face extending between the front face and the rear face. The front face of the core may be substantially planar. The rear face of the core may be substantially planar. The front and rear faces of the core may be substantially parallel to each other. In preferred embodiments, the core is substantially cylindrical.

The front face of the core is bonded to the housing by the sensing electrode. The sensing electrode may extend substantially over the front face of the core. The sensing electrode may also extend at least partially over the side face of the core. Preferably, the sensing electrode extends at least partially over the front face of the core and terminates on the front face of the core without extending over any portion of the side face of the core.

The core may have a central longitudinal axis extending between the front face and rear face. The core may have one or more degrees or rotational symmetry about the front and rear faces.

The core may have any suitable transverse cross-sectional shape. For example, the core may have a circular, elliptical, square, rectangular, triangular, pentagonal or hexagonal transverse cross-sectional shape. The transverse cross-sectional shape of the core may be substantially constant along the length of the core.

The core may have a length of between about 2 mm and about 80 mm, between about 2 mm and about 70 mm, or between about 2 mm and about 60 mm. The core may have a length of at least about 2 mm, at least about 2.5 mm, at least about 5 mm, at least about 10 mm or at least about 15 mm. The core may have a length of about 80 mm or less, about 70 mm or less, about 60 mm less, about 40 mm or less or about 30 mm or less.

The core may have a width or diameter of between about 0.5 mm and about 40 mm, between about 0.5 mm and about 30 mm, between about 0.5 mm and about 20 mm, between about 0.5 mm and about 10 mm or between about 0.5 mm and about 5 mm. The core may have a width or diameter of at least about 0.5 mm, at least about 1 mm, at least about 1.5 mm, at least about 2 mm, at least about 3.5 mm or at least about 4 mm. The core may have a width or diameter of about 30 mm or less, about 20 mm or less or about 15 mm or less. The width or diameter of the core may be substantially constant along the length of the core.

In some embodiments, the core may be formed of a plurality of bodies of electrically insulating ceramic material. In preferred embodiments, the core is a single piece component formed of a body of electrically insulating ceramic material.

The core comprises a cavity. The contact is arranged in the cavity. The cavity is an open cavity. The cavity has an open end at the front face. Preferably, the cavity is open at both ends. Advantageously, providing a cavity with two open ends enables the contact to be electrically connected to the sensing electrode at one end and electrically connected to an electrical connector at the other end. This enables the sensing electrode to receive a driving signal, via the contact, and enables a measurement signal to be received from the sensing electrode, via the contact.

The cavity may have an open end at the side face. In preferred embodiments, the cavity has an open end at the rear face. In these preferred embodiments, the cavity has an open end at the front face of the core and an open end at the rear face of the core, opposite the front face. The open end at the front face may be aligned with the open end at the rear face.

The cavity may extend in any suitable manner in the core. Preferably, the cavity extends substantially linearly within the core. The cavity may be located substantially centrally within the core. Where the core has a central longitudinal axis extending between the front and rear faces, preferably the cavity extends substantially along the central longitudinal axis. Where the core has a central longitudinal axis, the cavity may extend substantially coaxially with the core. The core may comprise a substantially tubular body of ceramic material. Where the cavity is open at both ends, the core may comprise an annular body of ceramic material. The cavity may be defined by an inner diameter of the annular body of ceramic material.

The probe also comprises a housing formed of electrically insulating ceramic material.

The core may be formed of any suitable electrically insulating ceramic material. In particular, the core may be formed of an electrically insulating material having a melting point above the operating temperature of the engine or engine component in which the probe is mounted.

In some embodiments, the ceramic material may comprise one or more of: alumina, zirconia, boron carbide, silicon nitride and aluminium nitride.

In some embodiments, the ceramic material of the housing is a different material to the ceramic material of the core. Preferably, the coefficient of thermal expansion of the ceramic material of the housing is substantially similar or the same as the coefficient of thermal expansion of the ceramic material of the core. In preferred embodiments, the housing is formed of the same ceramic material as the core. Advantageously, forming the housing and the core from the same ceramic material may prevent or inhibit differential thermal expansion of the housing and the core.

The housing may be adapted to be secured to a casing of an engine. In particular, the housing may be adapted to be secured to a casing of a gas turbine, in close proximity to the turbine blades of the gas turbine. For example, the housing may comprise one or more flanges which may be secured to the casing of an engine. The one or more flanges may comprise one or more mounting points. In some embodiments, the housing may be adapted to be secured to an outer housing and the outer housing may be adapted to be secured to the casing of an engine.

The housing may have a length of between about 2 mm and about 100 mm, between about 2 mm and about 80 mm, or between about 2 mm and about 50 mm, or between about 2 mm and about 30 mm. The housing may have a length of at least about 2 mm, at least about 5 mm, at least about 10 mm, at least about 15 mm or at least about 20 mm. The housing may have a length of about 100 mm or less, about 80 mm or less, about 50 mm or less, about 40 mm less, or about 30 mm or less.

The housing may have a thickness or a length between the front face of the housing and the rear face of the housing of between about 0.5 mm and about 5 mm, between about 0.5 mm and about 2.5 mm, between about 0.5 mm and about 1.5 mm. The housing may have a thickness or a length between the front face of the housing and the rear face of the housing of about 5 mm or less, about 2.5 mm or less, about 2 mm or less or about 1.5 mm or less.

The housing may have a width or diameter of between about 1 mm and about 50 mm, between about 1.5 mm and about 40 mm, or between about 2 mm and about 30 mm. The housing may have a width or diameter of at least about 1 mm, at least about 1.5 mm, at least about 2 mm, at least about 3 mm, at least about 3.5 mm or at least about 4 mm. The housing may have a width or diameter of about 50 mm or less, about 40 mm or less, about 35 mm or less or about 30 mm or less.

In some preferred embodiments, the housing comprises a core chamber. In these embodiments, the core is at least partially received in the core chamber. In some embodiments, the core may be entirely received in the core chamber.

In preferred embodiments, the housing has a front face and a rear face, opposite the front face. In these preferred embodiments, the rear face of the housing is bonded to the front face of the core by the sensing electrode. In embodiments comprising a core chamber, the rear face of the housing forms a face of the core chamber. In these preferred embodiments, the front face of the housing typically forms the sensing face of the probe that is intended to be arranged adjacent to the moving engine elements to be monitored.

The housing may be substantially impermeable to fluids. Advantageously, the housing may provide a barrier that substantially prevents fluid, including gases and liquids, from passing through the housing to the sensing electrode. In some preferred embodiments, the housing may prevent fluid from passing from the front face of the housing to the sensing electrode at the rear face of the housing. The housing may provide a hermetic barrier between the front face of the housing and the sensing electrode. Advantageously, this may provide some protection to the sensing electrode and improve the operational lifetime of the probe.

In preferred embodiments comprising a core chamber, the core chamber may be an open chamber defined by the rear face of the housing and a side face extending from the rear face to an open end. The rear face of the housing may be substantially planar. In preferred embodiments, the core is substantially cylindrical.

The core chamber may be configured such that the core is entirely receivable in the core chamber. The core chamber may be substantially the same size and shape as the core. Preferably, the length of the core chamber is slightly larger than the length of the core, such that the sensing electrode and the entire length of the core may be received in the core chamber. The side face of the core chamber may have a substantially similar length to the side face of the core. The side face of the core chamber may have a slightly larger length than the side face of the core.

The sensing electrode extends over at least a portion of the rear face of the housing. The sensing electrode may extend substantially over the rear face of the housing. Where the housing comprises a core chamber, the sensing electrode may also extend at least partially over the side face of the core chamber. In some embodiments, the sensing electrode may extend over substantially the entire side face of the core chamber. This may expose at least one end of the sensing electrode, and enable the sensing electrode to be electrically connected to other components of a sensor system. Preferably, the sensing electrode extends at least partially over the rear face of the housing and terminates on the rear face of the housing without extending over any portion of the side face of the core chamber.

The core chamber may have a central longitudinal axis extending between the rear face and the open end. The core chamber may have one or more degrees or rotational symmetry about the rear face and the open end.

The core chamber may have any suitable transverse cross-sectional shape. For example, the core chamber may have a circular, elliptical, square, rectangular, triangular, pentagonal or hexagonal transverse cross-sectional shape. The transverse cross-sectional shape of the core chamber may be substantially constant along the length of the core.

The core chamber may have a length of between about 2 mm and about 80 mm, between about 2 mm and about 70 mm, or between about 2 mm and about 60 mm. The core chamber may have a length of at least about 2 mm, at least about 2.5 mm, at least about 5 mm, at least about 10 mm or at least about 15 mm. The core chamber may have a length of about 80 mm or less, about 70 mm or less, about 60 mm less, or about 40 mm or less or about 30 mm or less.

The core chamber may have a width or diameter of between about 0.5 mm and about 40 mm, between about 0.5 mm and about 30 mm, between about 0.5 mm and about 20 mm, between about 0.5 mm and about 10 mm or between about 0.5 mm and about 5 mm. The core chamber may have a width or diameter of at least about 0.5 mm, at least about 1 mm, at least about 1.5 mm, at least about 2 mm, at least about 3.5 mm or at least about 4 mm. The core chamber may have a width or diameter of about 30 mm or less, about 20 mm or less or about 15 mm or less. The width or diameter of the core chamber may be substantially constant along the length of the chamber.

The core chamber may extend in any suitable manner in the housing. Preferably, the core chamber extends substantially linearly within the housing. The core chamber may be located substantially centrally within the housing. Where the housing has a central longitudinal axis, preferably the core chamber extends substantially along the central longitudinal axis. Where the housing has a central longitudinal axis, the core chamber may extend substantially coaxially with the housing. The housing may comprise a substantially tubular body of ceramic material, the tubular body having an open end and a closed end. The core chamber may be defined by the inner surfaces of the tubular body of ceramic material. In particularly preferred embodiments, the housing comprises a substantially cylindrical body of ceramic material and the core chamber comprises a substantially cylindrical chamber arranged coaxially in the housing.

In some embodiments, the housing may be formed of a plurality of bodies of electrically insulating ceramic material. For example, the housing may be formed of an annular body of electrically insulating ceramic material having an inner passageway that is closed at one end by a disc of electrically insulating ceramic material. In preferred embodiments, the housing is a single piece component formed of a body of electrically insulating ceramic material.

The probe may further comprise a guard or shield formed of electrically conductive material. The guard is electrically isolated from the sensing electrode. The guard is also electrically isolated from the contact. As used herein, the term "electrically isolated" denotes an arrangement of components that inhibits or prevents electrical current from flowing between the components. Typically, the guard is electrically isolated from the sensing electrode and the contact by physical separation, preferably including an electrically insulating material arranged in the space between. The guard may at least partially circumscribe the sensing electrode. The guard may circumscribe the sensing electrode. Preferably, the guard comprises a substantially annular body of electrically conductive material.

Preferably, the guard is arranged radially outwardly from the sensing electrode. The guard may be arranged between the housing and the core. The guard may be arranged between the housing and the front face of the core. Where the core comprises a side face extending between the front face and a rear face, the guard may extend over at least a portion of the side face of the core. The guard may extend substantially over the side face of the core. The guard may extend over at least a portion of the side face of the core and may terminate on the side face of the core without extending over any portion of the front face of the core. The guard may extend substantially to the front face of the core. The guard may extend over at least a portion of the side face of the core and over a portion of the front face of the core.

Where at least a portion of the guard extends over the front face of the core, the guard may be spaced from the sensing electrode.

Where the housing comprises a core chamber, at least a portion of the guard may be arranged in the core chamber.

Where the core chamber is defined by a rear face and a side face, at least a portion of the guard may be arranged between the side face of the core chamber and a side face of the core. A portion of the guard may be arranged between the rear face of the core chamber and the front face of the core. A portion of the guard may extend out of the open end of the core chamber. Advantageously, this may facilitate electrical connection of the guard to an electrical connector.

The guard may be formed of any suitable electrically conductive material. In some embodiments, the guard may be formed of an electrically conductive material that is different to the electrically conductive materials of the sensing electrode and the contact. In some preferred embodiments, the guard is formed of the same electrically conductive material as the sensing electrode. In some preferred embodiments, the guard is formed of the same electrically conductive material as the contact. Advantageously, forming the sensing electrode, the contact and the guard from the same electrically conductive material may prevent or inhibit differential thermal expansion of the sensing electrode, the contact and the guard.

The guard may be formed of an electrically conductive material having a melting point above the operating temperature of the engine or engine component in which the probe is mounted.

The electrically conductive material of the guard may comprise a metal. For example, the electrically conductive material of the guard may comprise one or more of: nickel, titanium, vanadium, chromium, zirconium, hafnium, ruthenium, rhodium, osmium, iridium, palladium, platinum, niobium, molybdenum, tantalum, tungsten and rhenium. The electrically conductive material of the contact may comprise a metal alloy.

In some embodiments, the electrically conductive material of the guard is an electrically conductive braze filler material. In these embodiments, the guard may be formed of a braze joint between the housing and the core. Advantageously, forming the guard from a braze joint between the housing and the core may improve the bonding between the housing and the core. In some preferred embodiments, the sensing electrode, the contact and the guard are formed of the same electrically conductive braze filler material.

In some preferred embodiments, the housing and the core are bonded together by the guard. Advantageously, bonding together the housing and the core by the sensing electrode and the guard may improve the bonding between the housing and the core. Where the housing comprises a core chamber, the side face of the core chamber of the housing and the side face of the core may be bonded together by the guard. In some preferred embodiments, the guard may be formed of a braze joint between the side face of the core chamber and the side face of the core.

The probe may comprise an outer housing formed of electrically conductive material, in particular a metal. The outer housing may be grounded. The outer housing may be electrically connected to the outer conductor of the coaxial cable. The outer housing may be adapted to be secured to the engine in which the probe is to be mounted.

The probe is generally configured to be electrically connected to a coaxial cable. As used herein, the term "coaxial cable" denotes a cable having an inner conductor and at least one outer conductor, electrically isolated from the inner conductor. A coaxial cable may have additional intermediate conductors arranged between the inner conductor and the outer conductor. For example, a coaxial cable may have an inner conductor, a single intermediate conductor and an outer conductor. Such a coaxial cable is referred to as a triaxial cable.

Since the probe is generally adapted to operate in high temperature environments, preferably the probe is electrically connected to a mineral insulated ("MI") coaxial cable. An MI cable comprises a tubular metallic oversheath and one or more internal conductors which are insulated from the sheath and from each other by the use of compacted insulating powder. The insulating powder is typically magnesium oxide or silicon dioxide.

Typically, the contact of the probe is electrically connected to the inner conductor of a coaxial cable. Accordingly, the sensing electrode is typically electrically connected to the inner conductor of a coaxial cable, via the contact.

Where the probe comprises a guard, the guard may be electrically connected to an intermediate conductor or an outer conductor of a coaxial cable. Preferably, the guard is connected to an intermediate conductor of a coaxial cable.

Where the probe comprises an outer housing, the outer housing may be electrically connected to the outer conductor of a coaxial cable.

The probes of the present invention are suitable for use in known sensor systems adapted for monitoring moving engine elements. Preferably, the probes of the present invention are used in a frequency modulated sensor system.

Known frequency modulated sensor systems typically comprise an oscillator module, a demodulator and an analyser. A brief description of a known arrangement of a frequency modulated system is provided below.

The oscillator module may be electrically connected to the sensing electrode via the inner conductor of a coaxial cable. The oscillator module may be configured to supply an oscillating signal to the sensing electrode and react to changes in capacitance that arise from moving engine elements coupling with the sensing electrode. The oscillator module may be configured to supply an oscillating signal having any suitable frequency. For example, the oscillator module may be configured to supply an oscillating signal having a frequency of between about 1 MHz and about 50 MHz, between about 1 MHz and about 40 MHz, between about 1 MHz and about 30 MHz, about 1 MHz and about 20 MHz or about 10 MHz.

Where the probe comprises a guard, the oscillator module may comprise a guard amplifier having an input electrically connected to the output of the oscillator and an output electrically connected to the guard via an intermediate conductor of a coaxial cable. The guard amplifier may be arranged to maintain the voltage between the sensing electrode and the guard at zero. This may minimise the internal capacitance of the probe and the coaxial cable.

Where the probe comprises an outer housing formed of electrically conductive material, the outer housing may be electrically connected to an outer conductor of a coaxial cable and the outer conductor of the coaxial cable may be grounded.

The oscillator module may be connected to the demodulator and the demodulator may be connected to the analyser. The reaction of the oscillator module to a change in capacitance may take the form of a change in frequency, and the demodulator may be configured to modulate a change in frequency to a change in voltage. The voltage change may be analysed by the analyser to monitor aspects of the moving engine elements passing over the probe.

According to a further aspect of the present invention, there may be provided a compressor comprising a casing defining a chamber and a plurality of compressor blades arranged in the chamber on a shaft, the compressor further comprising a probe according to the first aspect of the present invention, the probe being secured to the casing.

According to a further aspect of the present invention, there may be provided a gas turbine comprising a casing defining a chamber and a plurality of turbine blades arranged in the chamber on a turbine shaft, the gas turbine further comprising a probe according to the first aspect of the present invention, the probe being secured to the casing.

The housing of the probe may be sealed to the casing of the housing to substantially prevent fluids, including liquids and gases, from passing from the chamber to the sensing electrode of the probe. Preferably, the seal is a hermetic seal. The seal may be any suitable type of seal. The seal may be formed by a braze joint between the housing and the casing.

According to a further aspect of the present invention, there is provided a method of forming a probe for monitoring a moving engine element. The method comprises the steps of: providing a housing formed of electrically insulating ceramic material; providing a core formed of electrically insulating ceramic material, the core comprising front face; and bonding the housing to the front face of the core using an electrically conductive material arranged between the housing and the front face of the core. The electrically conductive material forms a sensing electrode arranged between the housing and the front face of the core.

In some preferred embodiments, the step of providing a core comprises providing a core having a cavity having an open end at the front face. In these preferred embodiments, the method may further comprise the step of arranging an electrically conductive material in the cavity of the core. The electrically conductive material arranged in the cavity of the core may form a contact arranged in electrical contact with the sensing electrode.

In some embodiments, the step of arranging the electrically conductive material in the cavity of the core may be performed after the step of bonding the housing to the front face of the core. In some embodiments, the step of arranging the electrically conductive material in the cavity of the core may be performed before the step of bonding the housing to the front face of the core.

In preferred embodiments, the step of arranging the electrically conductive material in the cavity of the core is performed before the step of bonding the housing to the front face of the core. Advantageously, this may result in the electrically conductive material in the cavity of the core being bonded with the electrically conductive material arranged between the housing and the front face of the core in the same step as bonding the housing to the front face of the core.

In preferred embodiments, the probe is a capacitive probe and the sensing electrode forms one electrode of a capacitor, the other electrode being formed by a moving engine element when a moving engine element is coupled with the sensing electrode. In preferred embodiments, the probe is a capacitive probe for monitoring turbine blades of a gas turbine.

In preferred embodiments, the housing and the front face of the core are bonded by a braze joint, the braze joint forming the sensing electrode.

In some of these preferred embodiments, the electrically conductive braze filler material is a paste. The paste may be arranged between the housing and the front face of the core prior to heating to melt the braze filler material. In some of these preferred embodiments, the electrically conductive braze filler material is arranged outside of the region between the housing and the front face of the core and is flowed between the housing and the front face of the core. The housing and the core may be configured and arranged with a gap between the front face of the housing and the core, the thickness of the gap being such that the molten braze filler material arranged at one end of the gap is drawn into the space between the housing and the core by capillary action.

In particularly preferred embodiments, the electrically conductive braze filler material may comprise a pre-formed component. For example, the electrically conductive braze filler material may comprise a plate or a disc. Preferably, the pre-formed component is arranged between the housing and the front face of the core prior to heating to melt the braze filler material.

In particularly preferred embodiments, the bonding of the housing to the front face of the core comprises: arranging an electrically conductive braze filler material between the housing and the front face of the core, in electrical contact with the electrically conductive material in the cavity of the core; and heating the housing, core and electrically conductive braze filler material to form a braze joint between the housing and the front face of the core. The braze joint forms the sensing electrode arranged between the housing and the front face of the core.

Preferably, the electrically conductive braze filler material is an active braze filler material. Advantageously, an active braze filler material enables the wetting of the surfaces to be joined to take place directly between the surfaces to be joined, such that no pre-treatment of the surfaces to be joined is required.

Where the electrically conductive braze filler materials are not active braze filler materials, the surfaces to be joined may be metallised prior to brazing. The surfaces to be joined may be metallised by any suitable method. For example, the surfaces to be joined may be metallised by vapour deposition or sputter coating.

The braze joint may be formed by any suitable brazing method. In particular, the braze joint may be formed in a furnace. The furnace may be a controlled-atmosphere furnace. The controlled atmosphere may be a protective gas atmosphere, such as an atmosphere of argon, helium, nitrogen or reducing gases like hydrogen or carbon monoxide. Preferably, the controlled-atmosphere is a vacuum.

The heating step may comprise the step of raising the temperature of the housing, core and electrically conductive braze filler material to a brazing temperature. The brazing temperature is above the melting temperature of the braze filler material. The brazing temperature may be at least about 10 degrees Celsius, at least about 20 degrees Celsius, at least about 30 degrees Celsius, at least about 40 degrees Celsius or at least about 50° C. above the melting temperature of the braze filler material. The housing, core and electrically conductive braze filler material may be maintained at the brazing temperature for a predetermined period of time. The housing, core and electrically conductive braze filler material may be maintained at the brazing temperature for at least 1 minute, at least 2 minutes, at least 5 minutes, at least 10 minutes, at least 20 minutes or at least 30 minutes.

The heating step may further comprise the step of raising the temperature of the housing, core and electrically conductive braze filler material to a heat soaking temperature prior to heating the housing, core and electrically conductive braze filler material to the brazing temperature. The heat soaking temperature is below the brazing temperature and the melting temperature of the electrically conductive braze filler material. The heat soaking temperature may be at least about 10 degrees Celsius, at least about 20 degrees Celsius, at least about 30 degrees Celsius, at least about 40 degrees Celsius or at least about 50° C. below the melting temperature of the braze filler material. The housing, core and electrically conductive braze filler material may be maintained at the heat soaking temperature for a predetermined period of time. The housing, core and electrically conductive braze filler material may be maintained at the heat soaking temperature for at least 1 minute, at least 2 minutes, at least 5 minutes, at least 10 minutes, at least 20 minutes or at least 30 minutes.

In some embodiments the contact may be formed of a braze joint in the cavity of the core. In these embodiments, the electrically conductive material arranged in the cavity of the core is an electrically conductive braze filler material. In these embodiments, the step of arranging the electrically conductive braze filler material in the cavity of the core is performed before the step of bonding the housing to the front face of the core.

The step of providing the housing may comprise providing a housing having a core chamber, and the step of providing a core may comprise arranging the core in the core chamber. The core chamber may be an open chamber defined by a rear face and a side face extending between the rear face and an open end. In preferred embodiments, the method comprises arranging the electrically conductive material on the rear face in the core chamber and arranging the core in the core chamber on the electrically conductive material. In some embodiments, the method further comprises arranging an electrically conductive material in the core chamber, between the side face of the core chamber and a side face of the core, electrically isolated from and substantially circumscribing the electrically conductive material arranged between the rear face of the core chamber and the front face of the core. The electrically conductive material substantially circumscribing the sensing electrode may form a guard.

The step of arranging the electrically conductive braze filler material between the side face of the core chamber and a side face of the core may be performed after the step of bonding the housing to the front face of the core. The step of arranging the electrically conductive braze filler material between the side face of the core chamber and a side face of the core may be performed before the step of bonding the housing to the front face of the core.

In some embodiments, the guard may be formed of a braze joint between the side face of the core chamber and the side face of the housing. In these embodiments, the electrically conductive material substantially circumscribing the sensing electrode is formed of an electrically conductive braze filler material. In these embodiments, the step of arranging the electrically conductive braze filler material between the side face of the core chamber and aside face of the core is performed before the step of bonding the housing to the front face of the core.

It will be appreciated that features described in relation to one aspect of the present invention may also be applied equally to the other aspects of the present invention. Features described in relation to the first aspect of the present invention may be applied equally to the second and third aspects of the present invention and vice versa. Features described in relation to the second aspect of the present invention may be applied equally to the third aspect of the present invention and vice versa.

The invention will be further described, by way of example only, with reference to the accompanying drawings, in which.

Figure 1:
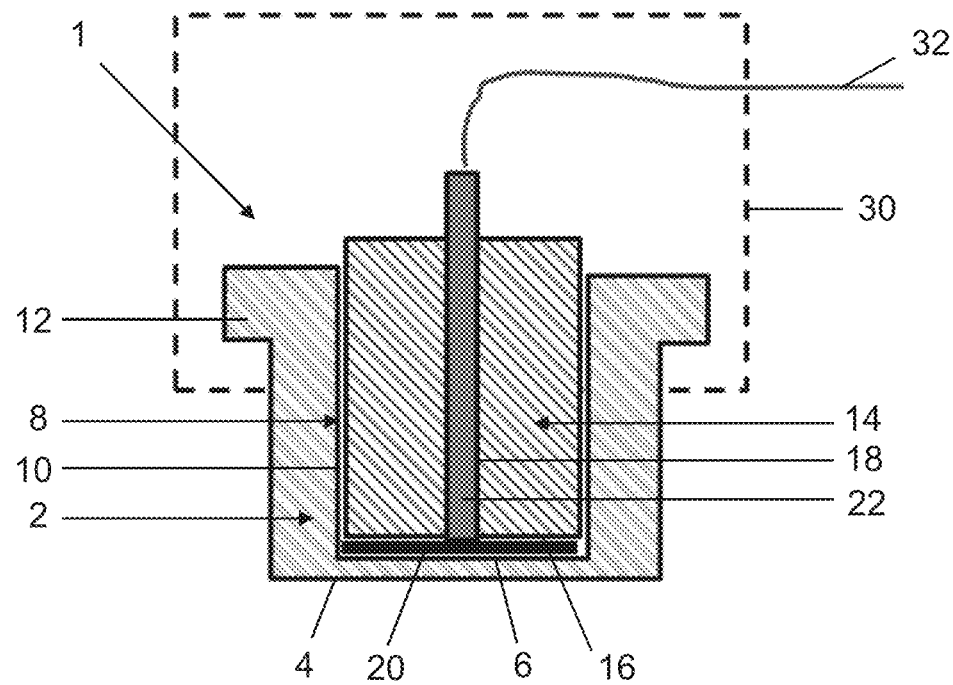
FIG. 1 shows a schematic cross-section of a probe according to an embodiment of the present invention.

FIG. 1 shows a schematic cross-section of a probe 1 according to an embodiment of the present invention. The probe 1 is configured to monitor a moving engine element, and in particular is configured to be mounted in a casing of a compressor and monitor the clearance and timing of the tips of compressor blades. As the probe 1 is adapted to be mounted in a casing of a compressor, the probe 1 is configured to withstand the operating temperatures within a compressor, typically up to about 600 degrees Celsius.

The probe 1 comprises a housing 2 formed of an electrically insulating ceramic material. In this embodiment, the housing 2 generally comprises an annular cylindrical body of sintered alumina that is closed at one end and open at the other end. The closed end of the housing 2 comprises a substantially circular front face 4 and a substantially circular rear face 6, opposite the front face 4. The front face 4 of the housing forms the sensing face of the probe that is intended to be arranged adjacent to the turbine blade tips when the probe 1 is mounted in the casing of a gas turbine. A cylindrical core chamber 8 is defined by the inner surfaces of the annular cylindrical body of the housing 2. The core chamber 8 is defined by the circular rear face 6 and a cylindrical side face 10 extending between the rear face 6 and the open end of the chamber. The housing 2 further comprises a flange 12 extending outwardly from the cylindrical body at the open end. The flange 12 is provided to facilitate mounting the probe.

The probe 1 further comprises a core 14 formed of the same electrically insulating ceramic material as the housing 2. In this embodiment, the core 14 generally comprises an annular cylindrical body of sintered alumina that is open at both ends. The core 14 comprises a circular front face 16, a circular rear face opposite the front face, and a cylindrical side face extending between the front face 16 and the rear face. The diameter of the core is substantially the same as the diameter of the core chamber 8 of the housing 2.

A cylindrical cavity 18 is defined by the cylindrical internal surface of the annular cylindrical body of the core 14. The cylindrical cavity 18 is open at the front face 16 of the core 14 and is open at the rear face of the core 14.

The rear face 6 of the housing 2 and the front face 16 of the core 14 are bonded together by a braze joint. The braze joint is formed by an electrically conductive braze filler material. In this embodiment, the electrically conductive braze filler material is an active braze filler material comprising an alloy of gold. The electrically conductive braze filler material defines a sensing electrode 20 arranged between the rear face 6 of the housing 2 and the front face 16 of the core 14. The sensing electrode 20 extends substantially over the entire front face 16 of the core 14 and the rear face 6 of the housing 2. As such, the sensing electrode 20 comprises a disc of electrically conductive braze filler material that substantially fills the space between the rear face 6 of the housing 2 and the front face 16 of the core 14.

A contact 22 formed of electrically conductive material is arranged in the cavity 18 of the core 14. The contact 22 generally comprises a cylindrical body of nickel arranged with one end in direct physical contact with the sensing electrode 20 at the front face 16 of the core, and the opposite end extending out of the core 14 through the open end of the cavity 18 at the rear face of the core 14.

The probe 1 generally has a cylindrical form with a central longitudinal axis. The housing 2, core 14, sensing electrode 20 and contact 22 are all coaxially aligned on the central longitudinal axis of the probe 1.

In this embodiment, the probe 1 is formed by arranging a paste of electrically conductive braze filler material in the core chamber 8, at the rear face 6 of the chamber. The core 14 is then arranged in the chamber 8, with the front face 16 of the core 14 at the paste of electrically conductive braze filler material. The housing 2, electrically conductive braze filler material and the core 14 are then heated in a vacuum furnace to a brazing temperature, above the melting temperature of the electrically conductive braze filler material. The heating, and subsequent cooling, forms a braze joint between the rear face 6 of the housing 2 and the front face 16 of the core 14. The braze joint forms the sensing electrode 20.

In this embodiment, the contact 22 is inserted into the cavity 18 of the core 14 after the housing 2, electrically conductive braze filler material and core 14 are heated to the brazing temperature.

The probe 1 generally forms part of a sensor system (not shown) and the housing 2 of the probe 1 is mounted within a sensor body 30. Typically the sensor body 30 is formed of an electrically conductive material, such as a metal or metal alloy, that is electrically connected to ground. The flanges 12 of the housing 2 may be secured to the sensor body 30 in any suitable manner. For example, the flanges 12 may be welded to the sensor body 30.

The probe 1 is electrically connected to other components of the sensor system via a triaxial cable having three coaxially arranged conductors. An inner conductor 32 of the coaxial cable is joined at one end to the contact 22. The inner conductor 32 is joined to the contact 22 at the end of the contact 22 extending out of the core 14 from the open end of the cavity 18 at the rear face. As a result, the sensing electrode 20 is electrically connected to other components of the sensor system via the contact 22 and the inner conductor 32 of the coaxial cable. In this embodiment, the intermediate conductor (not shown) of the triaxial cable terminates as the triaxial cable reaches the probe, without being electrically connected to the probe, and the outer conductor (not shown) of the coaxial cable is electrically connected to the sensor body 30.

Figure 2:
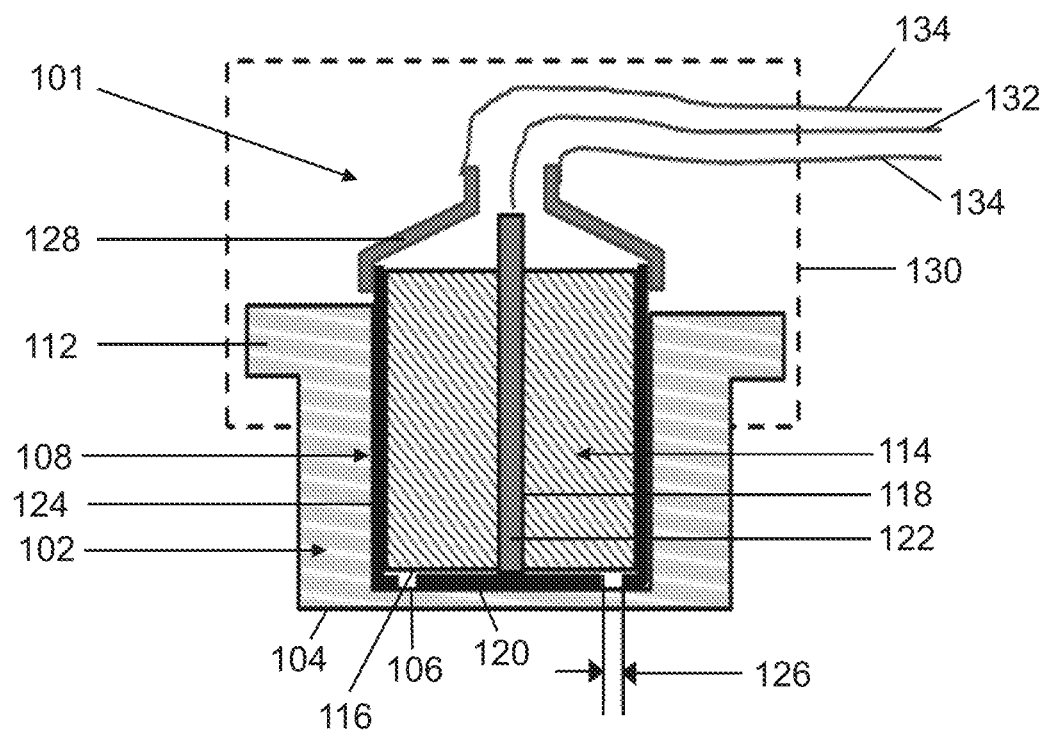
FIG. 2 shows a schematic cross-section of a probe according to an alternative embodiment of the present invention.

FIG. 2 shows a schematic cross-section of a probe 101 according to another embodiment of the present invention. The probe 101 is substantially similar to the probe 1 described above with reference to FIG. 1, and like reference numerals are used to refer to like features. The probe 101 is configured to be mounted in a casing of a gas turbine and monitor the clearance and timing of the tips of turbine blades of the gas turbine. As the probe 101 is adapted to be mounted in a casing of a gas turbine, the probe 101 is configured to withstand the high operating temperatures within a gas turbine, typically in excess of 1000 degrees Celsius, or even in excess of 1500 degrees Celsius.

The probe 101 comprises a housing 102 formed generally comprising an annular cylindrical body of sintered alumina that is closed at one end and open at the other end. The closed end of the housing 102 comprises a substantially circular front face 104 and a substantially circular rear face 106, opposite the front face 104. The front face 104 of the housing forms the sensing face of the probe that is intended to be arranged adjacent to the turbine blade tips when the probe 101 is mounted in the casing of a gas turbine. A cylindrical core chamber 108 is defined by the inner surfaces of the annular cylindrical body of the housing 102. The core chamber 108 is defined by the circular rear face 106 and a cylindrical side face extending between the rear face 106 and the open end of the chamber. The housing 102 further comprises a flange 112 extending outwardly from the cylindrical body to facilitate mounting the probe.

The probe 101 further comprises a core 114 generally comprising an annular cylindrical body of sintered alumina that is open at both ends. The core 114 comprises a circular front face 116, a circular rear face opposite the front face, and a cylindrical side face extending between the front face 116 and the rear face. The diameter of the core 114 is slightly smaller than the diameter of the core chamber 108 of the housing 102, such that the core 114 may be received in the core chamber 108 with a gap between the side face of the housing 102 and the side face of the core 114.

A cylindrical cavity 118 is defined by the cylindrical internal surface of the annular cylindrical body of the core 114, which is open at the front face 116 of the core 114 and is open at the rear face of the core 114.

The rear face 106 of the housing 102 and the front face 116 of the core 114 are bonded together by a braze joint. The braze joint is formed by an electrically conductive braze filler material comprising an alloy of titanium, chromium and vanadium. The electrically conductive braze filler material defines a sensing electrode 120 arranged between the rear face 106 of the housing 102 and the front face 116 of the core 114. The sensing electrode 120 extends partially over the front face 116 of the core 114 and the rear face 106 of the housing 102. As such, the sensing electrode 120 comprises a disc of electrically conductive braze filler material having a diameter that is smaller than the diameter of the front face 116 of the core 114.

A contact 122 is arranged in the cavity 118 of the core 114 and generally comprises a cylindrical body of nickel arranged with one end in direct physical contact with the sensing electrode 120 at the front face 116 of the core, and the opposite end extending out of the core 114 through the open end of the cavity 118 at the rear face of the core 114.

A guard 124 is arranged in the core chamber 108, between the housing 102 and the core 114. The guard 124 is formed of an electrically conductive material, and in this embodiment is formed of the same electrically conductive braze filler material as the sensing electrode. The guard 124 generally forms a cylindrical tube that is open at both ends and circumscribes the core 114 and the sensing electrode 120. The guard 124 fills the gap between the side face of the core chamber 108 and the side face of the core 114, extending out of the core chamber 108 at the open end and extending over the outer edge of the rear face 106 of the core chamber 108 and the front face 116 of the core 116. A gap 126 is provided between the sensing electrode 120 and the guard 124, which electrically isolates the sensing electrode 120 from the guard 124. The gap 126 forms an insulating ring between the rear face 106 of the core chamber 108 and the front face 116 of the core 114, circumscribing the sensing electrode 120. In some embodiments, a ring of electrically insulating ceramic material may be provided in the gap 126.

The probe 101 generally has a cylindrical form with a central longitudinal axis. The housing 102, core 114, sensing electrode 120, contact 122 and guard 124 are all coaxially aligned on the central longitudinal axis of the probe 101.

In this embodiment, the probe 101 is formed by arranging a pre-formed disc of electrically conductive braze filler material in the core chamber 108, at the rear face 106 of the chamber 108. A pre-formed tube of electrically conductive braze filler material is then arranged in the core chamber 108, spaced from the pre-formed disc of electrically conductive braze filler material. The core 114 is then arranged in the chamber 108, with the front face 116 of the core 114 at the pre-formed disc of electrically conductive braze filler material and the side face of the core 114 compressing the pre-formed tube of braze filler material against the side face of the core chamber 108. The contact 122 is then arranged in the cavity 118 of the core 114, with an end of the contact 122 in contact with the pre-formed disc electrically conductive braze filler material. The housing 102, pre-formed disc, pre-formed tube, core 114 and contact 122 are then heated in a vacuum furnace to a brazing temperature, above the melting temperature of the electrically conductive braze filler material. The heating, and subsequent cooling, forms a first braze joint between the rear face 106 of the housing 102 and the front face 116 of the core 114, which forms the sensing electrode 120, and a second braze joint between the side face of the housing 102 and the side face of the core 114, which forms the guard 124.

In this embodiment, the contact 122 is inserted into the cavity 118 of the core 114 after the core 114 is inserted into the core chamber 108 of the housing 102. As such, the cavity 118 of the core 114 provides a pathway for air to flow out of the core chamber 108 as the core 114 is inserted into the core chamber 108.

In this embodiment, the contact 122 is inserted into the cavity 118 of the core 114 before the housing 102, pre-formed disc of electrically conductive braze filler material and core 114 are heated to the brazing temperature. As such, the electrically conductive braze filler material that forms the first braze joint that forms the sensing electrode 120 also forms a braze joint with the contact 22, which ensures a robust electrical connection between the sensing electrode 120 and the contact 122.

The probe 101 generally forms part of a sensor system (not shown) and the housing 102 of the probe 101 is welded to a metallic sensor body 130, at the flange 112.

The probe 101 is electrically connected to other components of the sensor system via a coaxial cable having three coaxially arranged conductors. An inner conductor 132 of the coaxial cable is joined to the contact 122 at the end of the contact 122 extending out of the core 114 at the open end of the cavity 118 at the rear face. This connection of the contact 122 to the inner conductor 132 of the coaxial cable electrically connects the sensing electrode 120 to other components of the sensor system. An intermediate conductor 134 of the coaxial cable is joined to the connector 128 at the free end of the connector 128. This connection of the connector 128 to the intermediate conductor 134 of the coaxial cable electrically connects the guard 124 to other components of the sensor system. In this embodiment, the outer conductor (not shown) of the coaxial cable is electrically connected to the sensor body 130.

Figure 3:
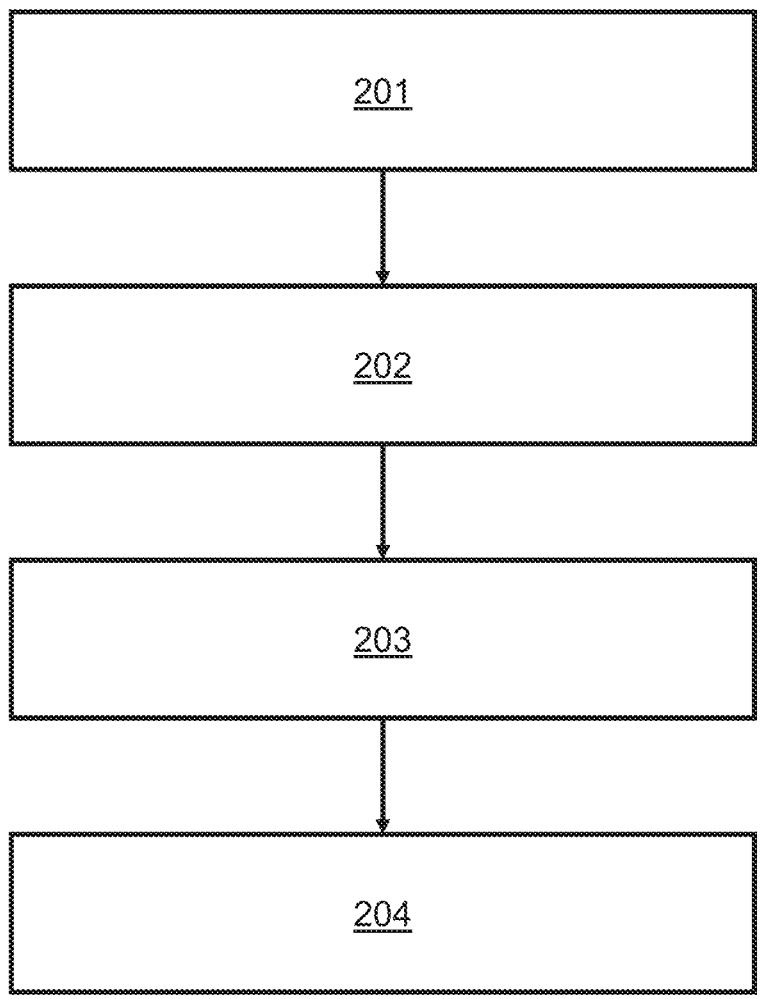
FIG. 3 shows a flow diagram of a method of forming a probe according to an embodiment of the present invention.

FIG. 3 shows a flow diagram for a method of forming a probe for monitoring a moving engine element according to an embodiment of the present invention.

The method comprises a first step 201 of providing a housing formed of electrically insulating ceramic material. In this embodiment, the first step 201 comprises providing a sintered or fired body of ceramic material.

The method further comprises a second step 202 of providing a core formed of electrically insulating ceramic material, the core comprising front face and a cavity having an open end at the front face. In this embodiment, the second step 202 comprises providing a sintered or fired body of ceramic material.

The method further comprises a third step 203 of arranging an electrically conductive material in the cavity of the core. The electrically conductive material extends in the cavity of the core at least to the opening at the front face of the core.

The method further comprises a fourth step 204 of bonding the housing to the front face of the core using an electrically conductive material arranged between the housing and the front face of the core.

The electrically conductive material arranged between the housing and the front face of the core forms a sensing electrode arranged between the housing and the front face of the core. The electrically conductive material arranged in the cavity of the core forming a contact arranged in electrical contact with the sensing electrode.

In this embodiment, the third step 203 is performed before the fourth step 204. However, it will be appreciated that in other embodiments the third step 203 may be performed after the fourth step 204.

In this embodiment, the fourth step 204 of bonding of the housing to the front face of the core comprises: arranging an electrically conductive braze filler material between the housing and the front face of the core, in electrical contact with the electrically conductive material in the cavity of the core; and heating the housing, core, electrically conductive material in the cavity of the core and electrically conductive braze filler material to form a braze joint between the housing and the front face of the core, the braze joint forming the sensing electrode arranged between the housing and the front face of the core.

It will be appreciated that the above described embodiments are exemplary embodiments of the invention only. It will also be appreciated that features described above in relation to one embodiment of the invention may also be applied to other embodiments of the invention.

The invention claimed is:

1. A probe for monitoring a moving engine element, the probe comprising:
   a housing formed of an electrically insulating ceramic material, the housing having a front face and a rear face opposite the front face, the front face of the housing forming a sensing face of the probe that is intended to be arranged adjacent to the moving engine element to be monitored by the probe;
   a core formed of the electrically insulating ceramic material, the core comprising a front face and a cavity having an open end at the front face;
   a sensing electrode formed of an electrically conductive braze filler material, the sensing electrode being arranged between the housing and the front face of the core, the rear face of the housing and the front face of the core being bonded together by the sensing electrode; and
   a contact formed of an electrically conductive material, the contact being arranged in the cavity of the core and being arranged in electrical contact with the sensing electrode;
   wherein the housing and the core are bonded together by a braze joint formed by the electrically conductive braze filler material, whereby the sensing electrode is formed of the electrically conductive braze filler material of the braze joint.

2. A probe according to claim 1, wherein the probe is a capacitive probe and the sensing electrode defines one of the electrodes of a capacitor, the other electrode being formed by a moving engine element when the moving engine element is coupled with the sensing electrode.

3. A probe according to claim 1, wherein the core comprises a rear face, opposite the front face, and a side face extending between the front face and the rear face.

4. A probe according to claim 1, wherein the core comprises a rear face, opposite the front face, and a side face extending between the front face and the rear face, and wherein the cavity of the core has an open end at the rear face.

5. A probe according to claim 3, wherein the probe further comprises a guard formed of the electrically conductive material, the guard being arranged at the side face of the core and electrically isolated from the sensing electrode and the contact.

6. A probe according to claim 5, wherein the guard is formed of same electrically conductive material as the sensing electrode.

7. A probe according to claim 1, wherein:
the housing comprises a front face and a rear face, opposite to the front face; and
the sensing electrode is arranged between the rear face of the housing and the front face of the core and the rear face of the housing and the front face of the core are bonded together by the sensing electrode.

8. A probe according to claim 7, wherein the housing comprises a core chamber, the core being at least partially received in the core chamber and the rear face of the housing forming a face of the core chamber.

9. A probe according to claim 8, wherein the core chamber is an open chamber defined by the rear face of the housing and a side face extending from the rear face to an open end.

10. A probe according to claim 1, wherein:
the core comprises a rear face, opposite the front face, and a side face extending between the front face and the rear face the housing comprises a front face and a rear face, opposite to the front face;
the probe further comprises a guard formed of the electrically conductive material, the guard being arranged at the side face of the core and electrically isolated from the sensing electrode and the contact;
the sensing electrode is arranged between the rear face of the housing and the front face of the core, the rear face of the housing and the front face of the core being bonded together by the sensing electrode;
the housing comprises a core chamber, the core chamber being an open chamber defined by the rear face of the housing and a side face extending from the rear face to an open end, and the core being at least partially received in the core chamber; and
the guard is arranged between the side face of the core chamber and the side face of the core.

11. A probe according to claim 10, wherein the side face of the core chamber of the housing and the side face of the core are bonded together by the guard, wherein the side face of the core chamber of the housing and the side face of the core are bonded together by a braze joint comprising an electrically conductive braze filler material, and wherein the guard is formed by the electrically conductive braze filler material.

12. A method of forming a probe for monitoring a moving engine element, the method comprising the steps of:
providing a housing formed of an electrically insulating ceramic material, the housing having a front face and a rear face opposite the front face, the front face of the housing forming a sensing face of the probe that is intended to be arranged adjacent to the moving engine element to be monitored by the probe;
providing a core formed of the electrically insulating ceramic material, the core comprising front face and a cavity having an open end at the front face;
bonding the rear face of the housing to the front face of the core using an electrically conductive braze filler material, the electrically conductive material arranged between the housing and the front face of the core forming a sensing electrode, wherein the step of bonding the housing to the front face of the core comprises heating the housing, core and electrically conductive braze filler material to form a braze joint between the housing and the front face of the core, wherein the housing and core are bonded together by the braze joint formed by the electrically conductive braze filler material, whereby the sensing electrode is formed of the electrically conductive material of the braze joint; and
arranging a contact formed of electrically conductive material in the cavity of the core in electrical contact with the sensing electrode.

13. A method according to claim 12, wherein the step of arranging the electrically conductive material in the cavity of the core is performed after the step of bonding the housing to the front face of the core.

14. A method according to claim 12, wherein the step of arranging the electrically conductive material in the cavity of the core is performed before the step of bonding the housing to the front face of the core.

* * * * *